(12) United States Patent
Juarez Corona

(10) Patent No.: US 9,789,824 B1
(45) Date of Patent: Oct. 17, 2017

(54) ROTATABLE CENTER CONSOLE COMPARTMENT OF A VEHICLE HAVING CUSTOMIZABLE SUBCOMPARTMENTS

(71) Applicant: FORD GLOBAL TECHNOLOGIES, LLC, Dearborn, MI (US)

(72) Inventor: Alejandro Juarez Corona, Tepotzotlan (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/204,621

(22) Filed: Jul. 7, 2016

(51) Int. Cl.
*B60R 7/00* (2006.01)
*B60R 7/04* (2006.01)
*B60Q 1/00* (2006.01)
*B60R 1/00* (2006.01)

(52) U.S. Cl.
CPC .............. *B60R 7/04* (2013.01); *B60Q 1/0082* (2013.01); *B60R 1/00* (2013.01); *B60R 2300/50* (2013.01)

(58) Field of Classification Search
CPC ..... B60R 2011/0007; B60R 7/04; B60R 1/00; B60N 2/4686; B60Q 1/0082
USPC .............................................. 296/37.8, 24.34
See application file for complete search history.

(56) References Cited

U.S. PATENT DOCUMENTS

| | | | |
|---|---|---|---|
| 5,102,181 A | 4/1992 | Pinkney | |
| 5,823,599 A | 10/1998 | Gray | |
| 6,338,514 B1 | 1/2002 | Arold et al. | |
| 6,655,561 B2 | 12/2003 | Panhelleux et al. | |
| 7,445,261 B2 | 11/2008 | Joler et al. | |
| 2010/0090491 A1 | 4/2010 | Hipshier et al. | |
| 2015/0165980 A1 | 6/2015 | Bisson | |

FOREIGN PATENT DOCUMENTS

| | | |
|---|---|---|
| DE | 102004063138 A1 | 7/2006 |
| EP | 2033843 A2 | 3/2009 |
| EP | 2033844 B1 | 8/2012 |
| JP | 0648237 A | 2/1994 |

OTHER PUBLICATIONS

English Machine Translation of DE102004063138A1.
English Machine Translation of EP2033843A2.
English Machine Translation of EP2033844B1.
English Machine Translation of JP0648237A.

*Primary Examiner* — Joseph D Pape
(74) *Attorney, Agent, or Firm* — Vichit Chea; King & Schickli, PLLC

(57) ABSTRACT

A center console includes a cylindrical shell defining a compartment. The compartment includes a spindle extending between first and second ends of the cylindrical shell and coaxially positioned within the cylindrical shell for rotation therein, and at least one divider supported by the spindle for subdividing the compartment. The spindle includes at least one support having a first magnet positioned therein and the at least one divider has a second magnet associated with an tongue such that the first magnet and the second magnet cooperate to secure the at least one divider to the spindle within the at least one support. A related method of accessing one of a plurality of subcompartments of a compartment defined by a cylindrical shell includes the steps of establishing a name the subcompartments, selecting by name one of the subcompartments for movement, and rotating the spindle and the subcompartments to allow access to the selected subcompartment.

20 Claims, 9 Drawing Sheets

ROTATABLE CENTER CONSOLE COMPARTMENT OF A VEHICLE HAVING CUSTOMIZABLE SUBCOMPARTMENTS

TECHNICAL FIELD

This document relates generally to vehicle center consoles, and more specifically to a rotatable compartment of a center console.

BACKGROUND

Vehicles incorporate center consoles having compartments therein for storing various objects such as keys, spare change, mobile phones, wallets, etc. The compartments are generally cubic and store the objects as in a simple box. Some compartments, however, utilize covers to create different levels inside the main compartment to subdivide the compartment.

The compartments are simple to use in that a vehicle operator can access the content of the compartment by pressing a latch release mechanism and raising a lid. Once open, object(s) may be placed inside the compartment or retrieved from the compartment and the lid returned to a closed, latched position. While this provides adequate storage space for the vehicle operator's chosen items, selecting a desired object from among the several objects stored in the compartment can be challenging while operating the vehicle. Even with the use of covers to create levels within the compartment, objects tend to move about freely dependent upon their weight and the manner in which the vehicle is operated. In other words, even careful placement of an object in one position within the compartment or on a cover does not ensure that the object will remain in the same position such that the object could be easily retrieved.

While a front vehicle passenger can devote full attention to the retrieval of an object from the compartment, the lack of suitable subdivisions and movement and mixing of objects within the compartment can still make retrieval difficult. The same is true for a rear vehicle passenger. In fact, the retrieval of objects from the compartment is even more difficult for the rear vehicle passenger. With the compartment lid in an open or raised position, the rear passenger's view is at least partially obscured and access to the compartment is limited by the open lid.

More important than the struggles of the vehicle's front and rear passengers, however, are the struggles of the vehicle operator in attempting to retrieve an object from the compartment while operating the vehicle. In these instances, the vehicle operator is often required to divert their attention from all aspects of driving to look into the compartment to locate a desired object for retrieval. Diverting the vehicle operators' attention even for a brief moment can result in a distracted driver which increases the danger to the distracted driver, other drivers on the road or highway, or nearby pedestrians. Even were the vehicle operator disciplined enough to keep their eyes on the road while attempting to retrieve an object from the compartment, they remain preoccupied with the task of finding and identifying the desired object while rummaging around within the compartment. Such rummaging action can also result in the vehicle operator damaging one or more objects stored in the compartment and/or being harmed by contact with a sharp or broken object.

Accordingly, a need exists for a center console compartment that is capable of separating objects into separate subcompartments for easy retrieval. As the objects typically stored in the compartment do not generally vary from day to day, the size of the subcompartments could be chosen by the vehicle operator to accommodate those known objects. Ideally, changing the size of the subcompartments would be easily accomplished by the vehicle operator when the vehicle is not being operated.

To accommodate retrieval of the objects stored in the subcompartments, the subcompartments could be individually identified and the compartment could rotate to provide access to a selected subcompartment. Access to the object(s) within the selected subcompartment could be through an aperture created by opening of a compartment lid or door. In order to ensure access to the subcompartment by the vehicle operator and passengers in the front and rear seats, the compartment door could slide into a wall of the center console or compartment so as not to block a line of sight of any of the vehicle occupants. Even more, individually identifying the subcompartments could be done using the vehicle's infotainment system or similar system and rotating the compartment to provide access to a selected subcompartment can likewise be achieved in a hands-free manner using one or more of the vehicle's systems.

SUMMARY OF THE INVENTION

In accordance with the purposes and benefits described herein, a center console for use in a vehicle is provided. The center console may be broadly described as including a cylindrical shell defining a compartment, a spindle extending between first and second ends of the cylindrical shell and coaxially positioned within the cylindrical shell for rotation therein, and at least one divider supported by the spindle for subdividing the compartment.

In another possible embodiment, the center console further includes a door forming a portion of the cylindrical shell.

In yet another possible embodiment, the cylindrical shell includes an inner wall and an outer wall together defining a slot for receiving the door when the door is moved from a closed position to an open position.

In still yet another possible embodiment, the cylindrical shell includes an inner wall and the at least one divider extends from the spindle to a position adjacent the inner wall to allow rotation of the at least one divider and the spindle within the cylindrical shell. In another, the at least one divider is removeably supported by the spindle.

In one other possible embodiment, the spindle includes at least one support having a first magnet positioned therein and the at least one divider has a second magnet associated with an tongue such that the first magnet and the second magnet cooperate to secure the at least one divider to the spindle within the at least one support.

In one additional possible embodiment, a vehicle having a center compartment disposed between a pair of front passenger seats includes a cylindrical shell defining the center compartment, a spindle extending between first and second ends of the cylindrical shell and coaxially positioned within the cylindrical shell for rotation therein, and at least one divider supported by the spindle for dividing the compartment into at least two subcompartments.

In another possible embodiment, the vehicle further includes a door providing access in an open position to the two or more subcompartments. In another, the door forms a portion of the cylindrical shell.

In yet another possible embodiment, the vehicle further includes an encoder associated with the spindle for determining a position of the spindle.

In still another possible embodiment, the vehicle further includes a visual indicator providing information to a vehicle operator concerning the accessibility of the two or more subcompartments based on the determined position of the spindle. In another, the visual indicator is a display.

In one additional possible embodiment, the vehicle further includes a switch for selecting one of the subcompartments for access and a motor for rotating the spindle to provide access to the one of the subcompartments through the door. In still another, the switch is mounted to a steering wheel.

In another possible embodiment, a method is provided of accessing one of a plurality of subcompartments of a compartment defined by a cylindrical shell having at least one divider supported by a spindle extending between first and second ends of the cylindrical shell and coaxially positioned within the cylindrical shell for rotation therein. The method may be broadly described as comprising the steps of: (a) establishing a name for each of the plurality of subcompartments; (b) sliding a door of the compartment to an open position revealing a subcompartment access aperture; (c) selecting by name one of the plurality of subcompartments for movement to a position accessible through the subcompartment access aperture; and (d) rotating the spindle and the plurality of subcompartments within the cylindrical shell to allow access through the subcompartment access aperture to the one of the plurality of subcompartments having the selected name.

In one possible embodiment, the establishing step includes the step of programming the name of each of the plurality of subcompartments into a center console control program.

In another possible embodiment, the programming step includes the steps of positioning each of the plurality of subcompartments adjacent the subcompartment access aperture, and assigning a name to each of the plurality of subcompartments when the plurality of subcompartments are positioned adjacent the subcompartment access aperture.

In yet another possible embodiment, the step of selecting a name of one of the plurality of subcompartments for movement includes the step of speaking the name. In still another, the step of selecting a name of one of the plurality of subcompartments for movement includes the step of navigating within a listing of names of the plurality of subcompartments to a name of a subcompartment for which access is desired.

In still yet another possible embodiment, the rotating step includes actuating a motor for rotating the spindle and the plurality of subcompartments to allow access to the one of the plurality of subcompartments having the selected name through the subcompartment access aperture.

In the following description, there are shown and described several embodiments of a center console for use in a vehicle. As it should be realized, the invention is capable of other, different embodiments and its several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle having a center console or compartment disposed between a pair of front passenger seats and together with the description serve to explain certain principles thereof. In the drawing figures.

Reference will now be made in detail to the present preferred embodiments of the vehicle having a center compartment disposed between a pair of front passenger seats, examples of which are illustrated in the accompanying drawing figures, wherein like numerals are used to represent like elements.

DETAILED DESCRIPTION

Figure 1:
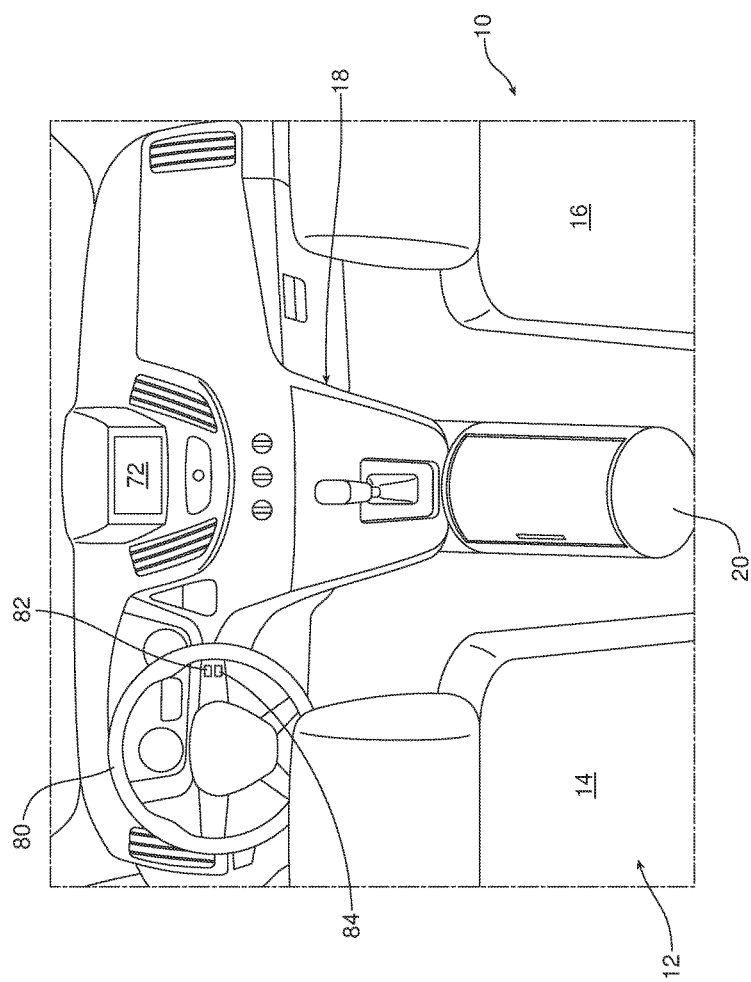
FIG. 1 is a perspective view of a passenger compartment of a vehicle having driver and passenger seats and a center console positioned therebetween.

Reference is now made to FIG. 1 which illustrates a portion of a vehicle 10 including a front row of seats 12. The front row of seats 12 includes a driver seat 14, a passenger seat 16, and a center console 18. The center console 18 is positioned between the driver seat 14 and the passenger seat 16 and includes a cylindrical shell 20 defining a compartment 22 therein for storing objects.

Figure 2:
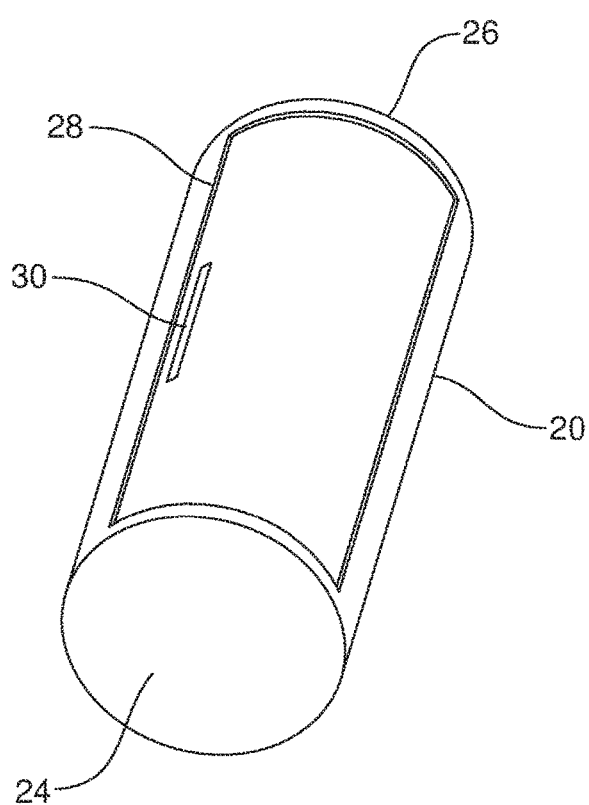
FIG. 2 is a perspective view of a cylindrical shell defining a compartment of the center console.

As shown in FIG. 2, the cylindrical shell 20 includes a first end 24 and a second end 26. In the described embodiment, a portion of the cylindrical shell 20 is formed by a door 28 having a handle 30 for opening the door to provide access to the compartment 22.

Figure 3:
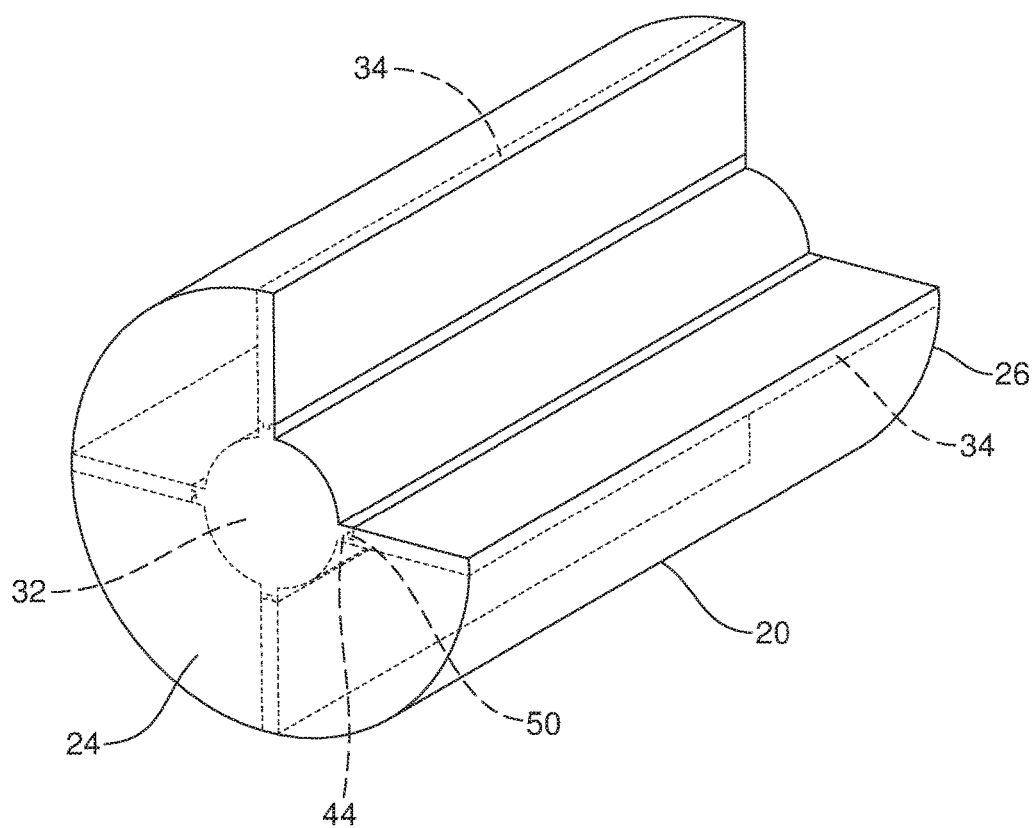
FIG. 3 is a perspective view of the cylindrical shell partially cutaway to reveal a spindle and dividers used to form subcompartments within the compartment.
Figure 4:
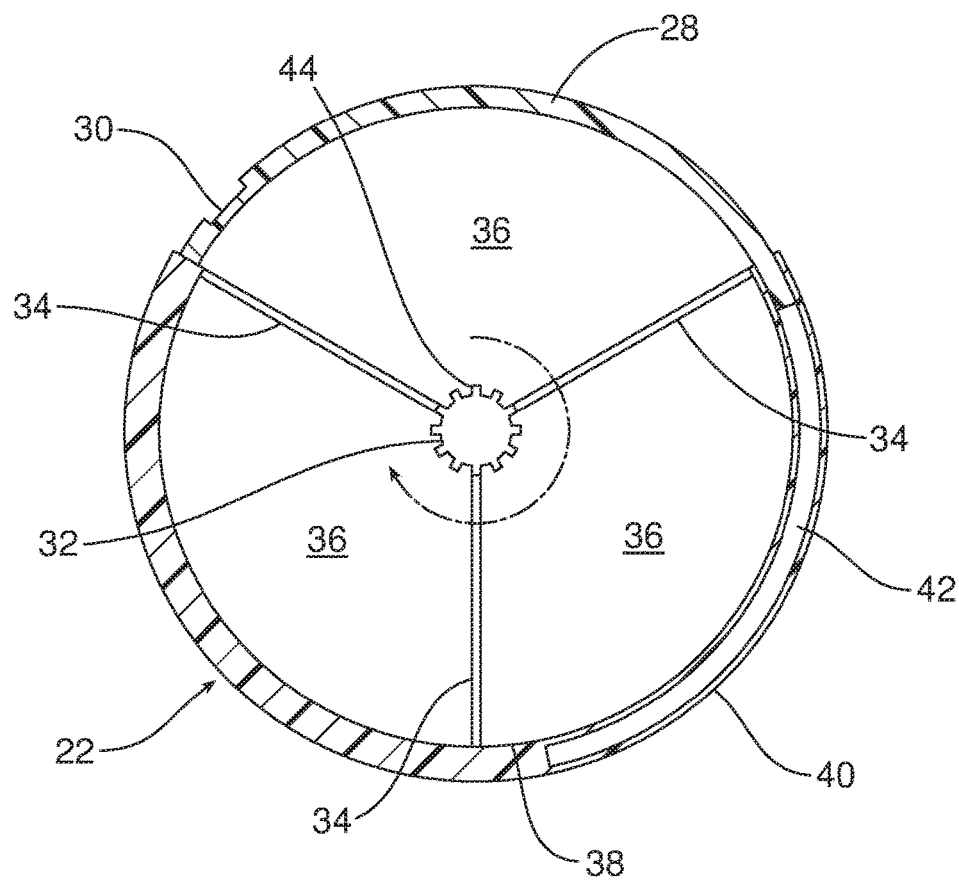
FIG. 4 is a cross section view of the cylindrical shell.

As shown in FIG. 3, a spindle 32, or rod, extends between the first end 24 and the second end 26 of the cylindrical shell 20. The spindle 32 is positioned coaxially with the cylindrical shell 20 for rotation therein. While the compartment 22 is subdivided into four subcompartments 36 utilizing four dividers 34 in the embodiment shown in FIG. 3, the described embodiment shown in FIG. 4 includes three dividers 34 supported by the spindle 32 that subdivide the compartment 22 into three separate subcompartments 36. Although three dividers 34 and three subcompartments 36 are shown in the described embodiment, any number of dividers may be utilized to subdivide the compartment 22 into subcompartments. The compartment 22 may be divided by a single divider, for example, into two subcompartments, by six dividers into six subcompartments. Even more, the spacing of the dividers may be such that the subcompartments are divided into subcompartments of varying sizes. Hereafter, subcompartments will generally be referred to by reference numeral 36.

Referring again to FIG. 4, the cylindrical shell 20 includes an inner wall 38 and an outer wall 40 which define a slot 42 therebetween. In the described embodiment, the slot 42 is sufficiently wide and positioned to receive the door 28 when the door is moved or slid from a closed position, as shown, to an open position. In another embodiment, the inner wall 38 and outer wall 40 could define a second slot on an opposite side of the door 28 allowing the door to be opened in an opposite direction, or the door could be hinged and open outwardly.

Figure 5:
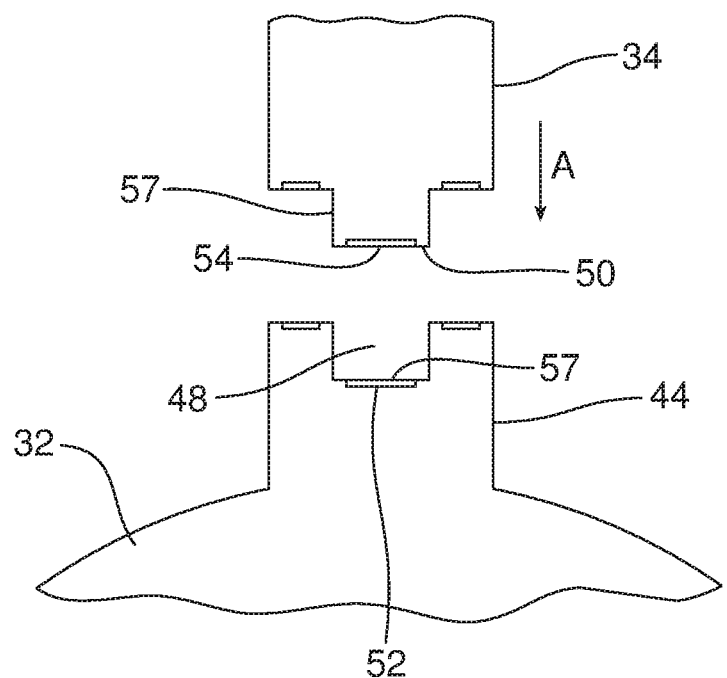
FIG. 5 is a partial cross section view of a support shown receiving a divider and one possible placement of magnets for removeably supporting the divider.

The described spindle 32 includes a plurality of supports 44 positioned an equidistance apart around the spindle to support the dividers 34. In other embodiments, the number of supports 44 and positioning of the supports around the spindle 32 may vary to create different sized subcompartments as discussed above. Each support 44 in the described embodiment, however, includes a generally U-shaped cross section defining a slot 48 or groove as shown in FIG. 5. The slot 48 is designed to receive a tongue 50 of a divider 34 and secure the divider to the spindle 32. A first magnet 52 is positioned within the slot 48 and a second magnet 54 is associated with the tongue 50 of the divider 34. The first and second magnets 52, 54 are positioned such that opposite poles are facing one another to provide an attractive force therebetween.

In the described embodiment, the support 44 and the divider 34 are each associated with three magnets. The magnets are shown positioned within the divider 34 and the support 44, however, the magnets may be associated with the divider and the support in any manner. For example, the support magnets 52 may be positioned below a surface of the support 44 allowing the divider magnets 54 to enter the support before contacting the support magnets.

In addition to magnets, the dividers 34 may be removeably supported by the spindle 32 in other manners including, for example, hook and loop fasteners and various mechanical mechanisms releasably securing the dividers in position. In still other embodiments, the number of subcompartments may be fixed allowing the dividers to be permanently attached to or supported by the spindle. In such an arrangement, the spindle and dividers could be integrally formed.

Figure 6:
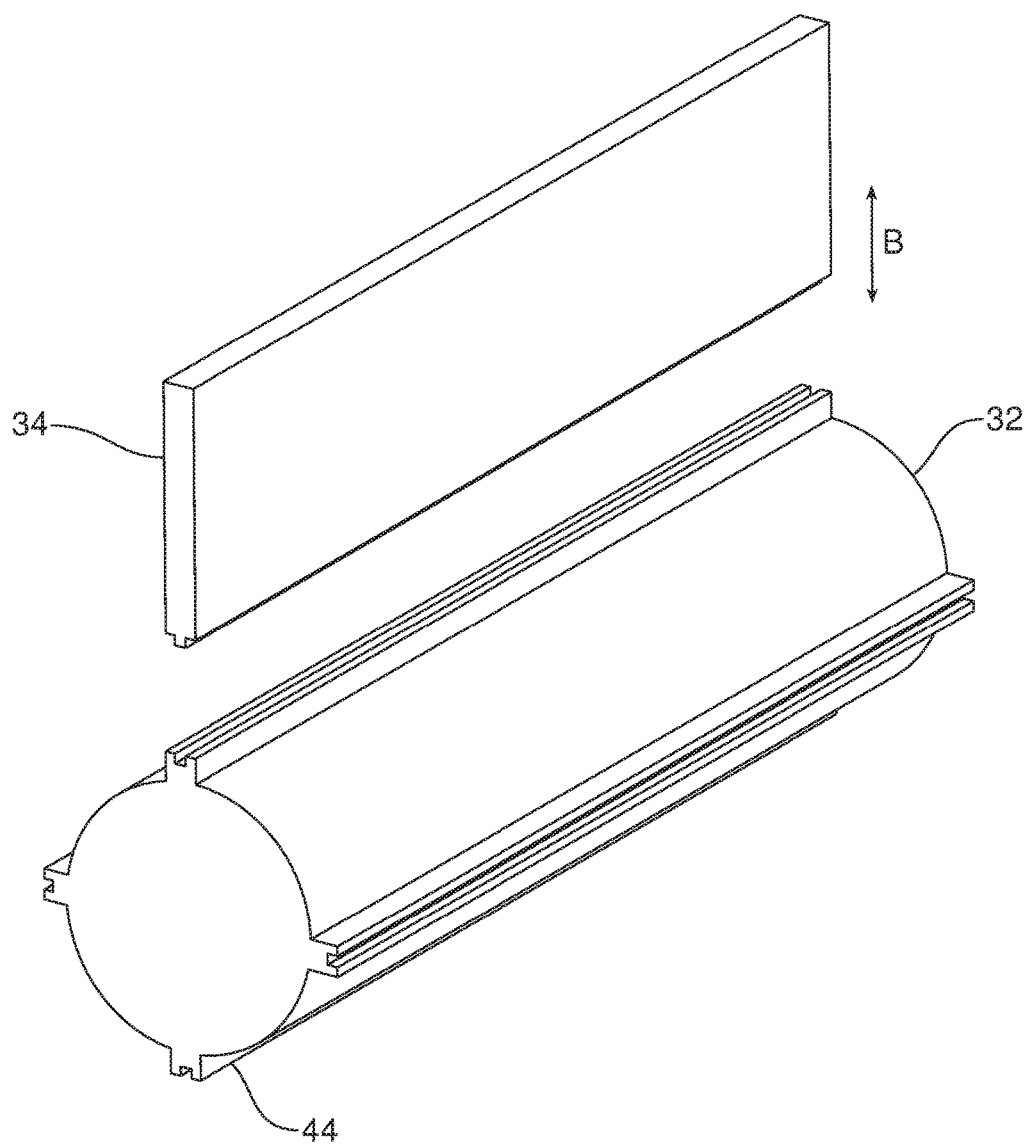
FIG. 6 is a perspective view of the spindle and a plurality of supports and a divider being removed from one of the supports.

Even more, the size and strength of the magnets may vary so long as the magnets are sufficient to secure the divider in position within the slot while allowing a vehicle operator to separate the divider 34 from the spindle 32 in the event the vehicle operator desires to change the number and/or size of the subcompartments of the compartment. In operation, the divider 34 is simply lowered into the slot 48 of the spindle 32, as shown by action arrow A in FIG. 5, allowing the attraction of the magnets to secure the divider in position. Removal of the divider 34 is similarly accomplished by a vehicle operator (V) pulling on the divider with a force that is sufficient to overcome the attractive force of the magnets as shown by action arrow B in FIG. 6.

Figure 7:
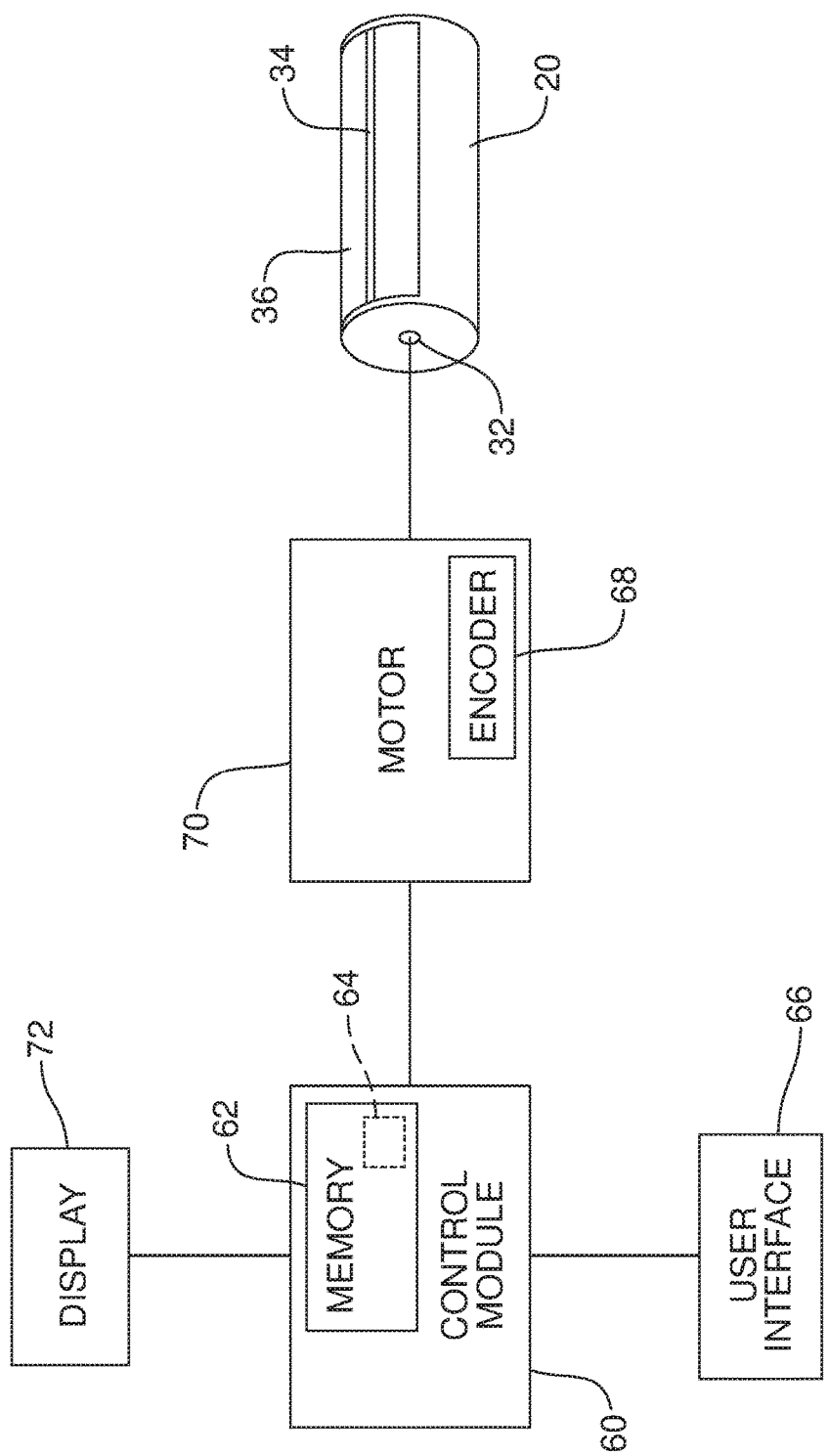
FIG. 7 is a block diagram of an exemplary center console controller including a components used to program names of the subcompartments, select a desired subcompartment for access, and rotate the desired subcompartment to an accessible position within the cylindrical shell.

Reference is now made to FIG. 7 which illustrates a schematic diagram of an exemplary central console control system. As shown, a control module 60 includes a memory 62 wherein a central console control program 64 is stored. The control module 60 continuously monitors a user interface 66 for receiving instruction from a vehicle operator. An encoder 68 associated with a motor 70 for rotating the spindle 32 provides information concerning a position of the spindle and subcompartments 36 to the control module 60, and a visual indicator 72 provides information to the vehicle operator concerning the subcompartments and their accessibility. Although the noted components are shown directly connected, each of the components may provide signals and/or information through one or more control modules utilizing an internal communications network that interconnects components inside the vehicle (e.g., a controller area network (CAN) or local interconnect network (LIN) as is known in the art.

As shown in FIG. 7, the motor 70 may be associated with the spindle 32 to rotate the spindle and subcompartments 36 so that a desired subcompartment is positioned for access by the vehicle operator when the door 28 is in the open position. In the described embodiment, the motor 70 includes the encoder 68 to monitor a position of the spindle 32 and provide this information to the control module 60. In this manner, the spindle 32 can be controllably rotated to a desired position to provide access to a desired subcompartment 36. Other electronic devices may be utilized to determine the position of the spindle including, for example, a potentiometer, and the encoder or other electronic devices may be separate from the motor 70, as is known in the art.

In the described embodiment, the visual indicator 72 is a display. The display 72 could be a central console or navigation screen, as shown in FIG. 1, a heads up display (not shown), or more simply an indicator within a cluster panel of the instrument panel whether digital or analog. The vehicle operator can look at the display 72 showing a listing of names 80 of the various subcompartments 36 and use the user interface 66 to step through the listing of names until a desired name of a subcompartment is selected.

Figure 8:
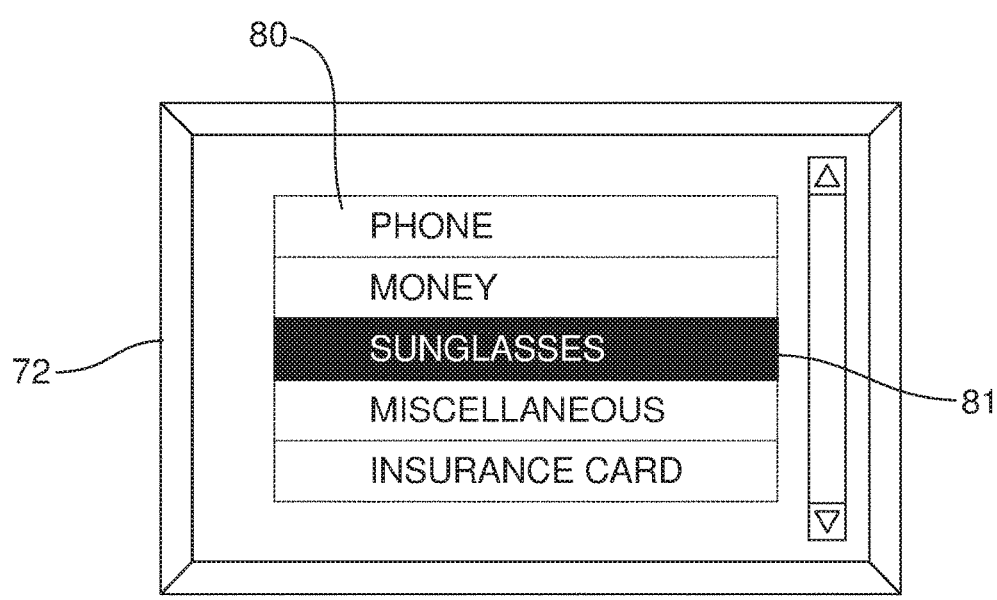
FIG. 8 is a front plan view of a display showing a listing of names of subcompartments.
Figure 9:
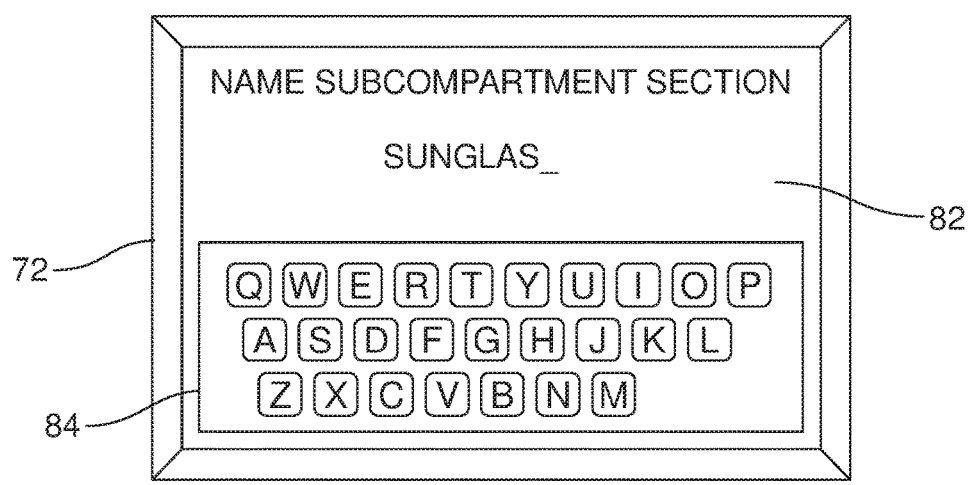
FIG. 9 is a front plan view of a display showing a Name Subcompartment Section of a central console control program used to name subcompartments of the center console.

In the described embodiment, the user interface 66 is a switch mounted on a steering wheel 80 as is known in the art. More specifically, the switch 66 includes an "UP" button 82 and a "DOWN" button 84 as shown in FIG. 1. Referring to FIG. 8, the vehicle operator can look at the display 72 showing the listing of names 80 and use the "UP" button 82 and the "DOWN" button 84 to navigate or step through the listing of names 80 until a desired subcompartment name (e.g., "SUNGLASSES") is selected. The selected subcompartment name is highlighted, as shown, to simplify the task for the vehicle operator. Once selected, the control module 60 communicates the selected subcompartment 36 to the motor 70 which rotates the spindle 32 accordingly to allow access to the selected subcompartment through the door 28. Selection may occur by positioning the desired subcompartment name within a highlighted area 81 of the display 72 or a separate push button (not shown) may be utilized to confirm the selection.

In operation, the vehicle operator must first establish a desired number of subcompartments 36 and position one or more dividers 34 accordingly. The dividers 34 may be spaced an equidistance apart creating uniformly sized subcompartments 36 or otherwise creating subcompartments of varying sizes. Once the dividers 34 are positioned, a name for each of the subcompartments 36 is established.

In the described embodiment, subcompartment names are established by programming a name for each of the subcompartments 36 into the central console control program 64. This includes positioning a subcompartment 36 adjacent a subcompartment access aperture created when the door 28 is opened. Once the subcompartment 36 is positioned, a name is assigned to the subcompartment.

In the described embodiment, the name is assigned using a configuration panel 82 of the display 72. As is known in the art, the configuration panel 82 and display 72 may be part of a vehicle infotainment system. The vehicle operator opens the configuration panel 82, activates a "Name Subcompartment Section" option, and enters the name of the subcompartment 36. In the described embodiment, the name is entered using an electronic keyboard 84 displayed on the configuration panel 82 and display 72. In alternate embodiments, the listing of names 80 may simply include selectable numeric or alphanumeric names. Even more, the subcompartments 36 may be pre-named. The name of the subcompartment 36 and a position of the spindle 32 are stored in memory 62 for later reference by the central control console program 64. These steps are repeated until the subcompartments 36 are named and their respective positions associated with the name and stored. This may include one or more of the subcompartments 36.

As described above, the vehicle operator can look at the display 72 showing the listing of names 80 of the various subcompartments 36 and use the user interface 66 to step through the listing until a desired subcompartment is selected. In the described embodiment, the name of the subcompartment presently accessible through the door 28 is shown and the names of subcompartments immediately to the left and to the right are also shown above and below the name of the accessible subcompartment. In this manner, the vehicle operator can easily determine which subcompartment 36 is accessible and the names of adjacent subcompartments. Once the name of the subcompartment is selected, the motor 70 is actuated to rotate the spindle 32 and the subcompartments 36 to allow the desired access to the named subcompartment.

In an alternate embodiment, the vehicle operator could use voice commands to select the subcompartment 36 by simply speaking the name of the subcompartment. In this embodiment, a speaker (not shown) mounted in the passenger compartment receives the spoken command and instructs the control module 60 to rotate the motor 70 such that the desired subcompartment 36 is accessible when the door 28 is open.

In summary, numerous benefits result from the utilization of a rotatable center console compartment of a vehicle 10 as illustrated in this document. The center console allows for separating objects into separate subcompartments for easy retrieval. To accommodate retrieval of the objects stored in the subcompartments, the subcompartments are individually identified and the compartment rotates to provide access to a selected subcompartment. Even more, individually identifying the subcompartments is accomplished using the vehicle's infotainment or similar system and rotating the compartment to provide access to a selected subcompartment is likewise achieved in a hands-free manner using one or more of the vehicle's systems.

The foregoing has been presented for purposes of illustration and description. It is not intended to be exhaustive or to limit the embodiments to the precise form disclosed. Obvious modifications and variations are possible in light of the above teachings. For example, the number and size of subcompartments may be predetermined and names programmed for each subcompartment (e.g., "Phone," "Money," and "Sunglasses"). In such an embodiment, the user would simply select the name of the subcompartment for which access is desired from the listing of names. All such modifications and variations are within the scope of the appended claims when interpreted in accordance with the breadth to which they are fairly, legally and equitably entitled.

What is claimed:

1. A center console for use in a vehicle, comprising:
a cylindrical shell defining a compartment;
a spindle extending between first and second ends of said cylindrical shell and coaxially positioned within said cylindrical shell for rotation therein; and
at least one divider supported by said spindle for subdividing said compartment;
wherein said cylindrical shell includes an inner wall and an outer wall together defining a slot for receiving a door forming a portion of said cylindrical shell when said door is moved from a closed position to an open position.

2. The vehicle of claim 1, further comprising an encoder associated with said spindle for determining a position of said spindle.

3. The vehicle of claim 1, wherein said at least one divider is magnetically supported by said spindle for subdividing said compartment.

4. A vehicle having a compartment disposed between a pair of front passenger seats, comprising:
a cylindrical shell defining the compartment;
a spindle extending between first and second ends of said cylindrical shell and coaxially positioned within said cylindrical shell for rotation therein;
at least one divider supported by said spindle for dividing said compartment into at least two subcompartments; and
an encoder associated with said spindle for determining a position of said spindle.

5. The vehicle of claim 4, further comprising a door providing access in an open position to said at least two subcompartments.

6. The vehicle of claim 4, further comprising a visual indicator providing information to a vehicle operator concerning the accessibility of said at least two subcompartments based on the determined position of said spindle.

7. The vehicle of claim 6, wherein said visual indicator is a display.

8. The vehicle of claim 7, further comprising a switch for selecting one of said at least two subcompartments for access and a motor for rotating said spindle to provide access to said one of said at least two subcompartments through a door.

9. The vehicle of claim 8, wherein said switch is mounted to a steering wheel.

10. A method of accessing a plurality of subcompartments of a compartment defined by a cylindrical shell having at least one divider supported by a spindle extending between first and second ends of the cylindrical shell and coaxially positioned within the cylindrical shell for rotation therein, comprising the steps of:
entering a name for at least one of said plurality of subcompartments;
sliding a door of said compartment to an open position revealing a subcompartment access aperture;
selecting by name one of said plurality of subcompartments for movement to a position accessible through said subcompartment access aperture; and
rotating said spindle and said plurality of subcompartments within said cylindrical shell to allow access through said subcompartment access aperture to said one of said plurality of subcompartments having the selected name.

11. The method of accessing a plurality of subcompartments of claim 10, wherein the entering step includes the step of programming the name of each of said plurality of subcompartments into a center console control program.

12. The method of accessing a plurality of subcompartments of claim 11, wherein the programming step includes the steps of positioning at least one of said plurality of subcompartments adjacent the subcompartment access aperture, and assigning a name to said at least one of said plurality of subcompartments when said plurality of subcompartments are positioned adjacent the subcompartment access aperture.

13. The method of accessing a plurality of subcompartments of claim 10, wherein the step of selecting by name one of said plurality of subcompartments for movement includes the step of speaking the name.

14. The method of accessing a plurality of subcompartments of claim 10, wherein the step of selecting by name one of said plurality of subcompartments for movement includes the step of navigating within a listing of names of said plurality of subcompartments to a name of a subcompartment to access.

15. The method of accessing a plurality of subcompartments of claim 10, wherein said rotating step includes actuating a motor for rotating said spindle and said plurality of subcompartments to allow access to one of said plurality of subcompartments having the selected name through the subcompartment access aperture.

16. A center console for use in a vehicle, comprising:
a cylindrical shell defining a compartment;
a spindle extending between first and second ends of said cylindrical shell and coaxially positioned within said cylindrical shell; and
at least one divider magnetically supported by said spindle.

17. The center console for use in a vehicle of claim 16, wherein said spindle includes at least one support having a first magnet positioned therein and said at least one divider has a second magnet associated with a tongue such that said first magnet and said second magnet cooperate to secure said at least one divider to said spindle within said at least one support.

18. The vehicle of claim 16, further comprising an encoder associated with said spindle for determining a position of said spindle.

19. The vehicle of claim 18, further comprising a visual indicator providing information to a vehicle operator concerning the accessibility of at least two subcompartments based on the determined position of said spindle.

20. The vehicle of claim 16, further comprising a switch for selecting one of at least two subcompartments for access and a motor for rotating said spindle to provide access to said one of said at least two subcompartments.

* * * * *